(12) United States Patent
Yamashita

(10) Patent No.: US 9,172,887 B2
(45) Date of Patent: Oct. 27, 2015

(54) IMAGING APPARATUS, CONTROL METHOD OF IMAGING APPARATUS, INTERCHANGEABLE LENS AND LENS-INTERCHANGEABLE TYPE IMAGING APPARATUS BODY

(71) Applicant: FUJIFILM Corporation, Tokyo (JP)

(72) Inventor: Hayato Yamashita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/317,783

(22) Filed: Jun. 27, 2014

(65) Prior Publication Data

US 2014/0307124 A1    Oct. 16, 2014

Related U.S. Application Data

(63) Continuation of application No. PCT/JP2012/082383, filed on Dec. 13, 2012.

(30) Foreign Application Priority Data

Dec. 28, 2011    (JP) .................................. 2011-288030

(51) Int. Cl.
     *H04N 5/235*      (2006.01)
     *G03B 7/20*      (2006.01)
     (Continued)

(52) U.S. Cl.
     CPC ............... *H04N 5/2353* (2013.01); *G03B 7/20* (2013.01); *G03B 17/14* (2013.01); *H04N 5/2173* (2013.01);
     (Continued)

(58) Field of Classification Search
     CPC ........................... H04N 5/2352; H04N 5/2254
     USPC ....................................................... 348/229.1
     See application file for complete search history.

(56) References Cited

U.S. PATENT DOCUMENTS 4,537,487 A * 8/1985 Taniguchi et al. ............... 396/93
4,613,748 A * 9/1986 Imai ............................ 250/201.8
(Continued)

FOREIGN PATENT DOCUMENTS

| JP | 3-78733 A | 4/1991 |
|---|---|---|
| JP | 6-178198 A | 6/1994 |

(Continued)

OTHER PUBLICATIONS

Aoyanagi Hidehiko, JP Patent Application Pub 2012-215643, Nov. 2012, abstract, english translation.*

(Continued)

*Primary Examiner* — Roberto Velez
*Assistant Examiner* — Cynthia Segura
(74) *Attorney, Agent, or Firm* — Birch, Stewart, Kolasch & Birch, LLP

(57) ABSTRACT

An imaging apparatus includes: a lens-interchangeable type imaging apparatus body which includes a solid-state imaging device; and an interchangeable lens as defined herein; and the interchangeable lens is provided with a first storage portion which stores individual difference information about brightness of the interchangeable lens; and the lens-interchangeable type imaging apparatus body is provided with a second storage portion which stores information about a change of incident light sensitivity of the solid-state imaging device relative to each diaphragm value, and a control portion which uses the individual difference information about the brightness read from the first storage portion of the mounted interchangeable lens and the information about the change of the sensitivity in the second storage portion to thereby correct exposure at a time of imaging the photographic subject.

4 Claims, 11 Drawing Sheets

(51) Int. Cl.
*G03B 17/14* (2006.01)
*H04N 5/232* (2006.01)
*H04N 5/243* (2006.01)
*H04N 5/217* (2011.01)
*H04N 5/355* (2011.01)

(52) U.S. Cl.
CPC ............ *H04N 5/243* (2013.01); *H04N 5/3559* (2013.01); *G03B 2206/00* (2013.01); *H04N 5/23209* (2013.01)

(56) References Cited

U.S. PATENT DOCUMENTS

| | | | |
|---|---|---|---|
| 4,954,897 A * | 9/1990 | Ejima et al. | 348/229.1 |
| 4,984,007 A * | 1/1991 | Takagi | 396/234 |
| 5,168,365 A * | 12/1992 | Kawahara | 348/364 |
| 5,325,149 A * | 6/1994 | Kawahara | 396/259 |
| 5,713,053 A * | 1/1998 | Hirai | 396/92 |
| 5,926,287 A | 7/1999 | Suzuki et al. | |
| 6,784,938 B1 | 8/2004 | Kidono et al. | |
| 6,813,442 B2 * | 11/2004 | Matsuda | 396/91 |
| 2001/0015832 A1 | 8/2001 | Suzuki et al. | |
| 2003/0179416 A1 | 9/2003 | Suzuki et al. | |
| 2003/0193695 A1 * | 10/2003 | Shirakawa | 358/302 |
| 2005/0062874 A1 | 3/2005 | Shiga et al. | |
| 2005/0068428 A1 | 3/2005 | Uchida | |
| 2006/0098114 A1 * | 5/2006 | Horii | 348/360 |
| 2006/0158546 A1 | 7/2006 | Hirai | |
| 2008/0079821 A1 * | 4/2008 | Nagata et al. | 348/231.99 |
| 2008/0079836 A1 * | 4/2008 | Nagata et al. | 348/340 |
| 2008/0204575 A1 | 8/2008 | Shiga et al. | |
| 2009/0002511 A1 * | 1/2009 | Jacumet | 348/222.1 |
| 2009/0022486 A1 * | 1/2009 | Muramatsu | 396/104 |
| 2009/0147086 A1 | 6/2009 | Uchida | |
| 2009/0284612 A1 * | 11/2009 | Abe et al. | 348/221.1 |
| 2009/0309993 A1 | 12/2009 | Hirai | |
| 2010/0232779 A1 * | 9/2010 | Okamoto et al. | 396/257 |
| 2011/0122310 A1 * | 5/2011 | Kudo | 348/349 |
| 2011/0292272 A1 * | 12/2011 | Terashima et al. | 348/345 |
| 2014/0248043 A1 * | 9/2014 | Ohara et al. | 396/80 |

FOREIGN PATENT DOCUMENTS

| | | |
|---|---|---|
| JP | 8-220584 A | 8/1996 |
| JP | 11-119286 A | 4/1999 |
| JP | 2001-78086 A | 3/2001 |
| JP | 2002-185822 A | 6/2002 |
| JP | 2002-232772 A | 8/2002 |
| JP | 2002-330334 A | 11/2002 |
| JP | 2004-129025 A | 4/2004 |
| JP | 2005-109621 A | 4/2005 |
| JP | 2006-343584 A | 12/2006 |
| JP | 2008-134312 A | 6/2008 |
| JP | 2009-272735 A | 11/2009 |
| JP | 2010-172013 A | 8/2010 |
| JP | 2012215643 A * | 11/2012 ............... G03B 9/02 |

OTHER PUBLICATIONS

International Search Report, issued in PCT/JP2012/082383, dated Mar. 19, 2013.
Written Opinion of the International Search Authority, issued in PCT/JP2012/082383, dated Mar. 19, 2013.

* cited by examiner

IMAGING APPARATUS, CONTROL METHOD OF IMAGING APPARATUS, INTERCHANGEABLE LENS AND LENS-INTERCHANGEABLE TYPE IMAGING APPARATUS BODY

CROSS REFERENCE TO RELATED APPLICATION

This is a continuation of International Application No. PCT/JP2012/082383 filed on Dec. 13, 2012, and claims priority from Japanese Patent Application No. 2011-288030 filed on Dec. 28, 2011, the entire disclosures of which are incorporated herein by reference.

TECHNICAL FIELD

The present invention relates to an imaging apparatus, a control method of the imaging apparatus, an interchangeable lens and a lens-interchangeable type imaging apparatus body.

BACKGROUND ART

Generally, when a diaphragm provided in an imaging lens system is set on an open aperture side, oblique incident light cannot enter each of pixels (photodiodes) of a solid-state imaging device (image sensor) sufficiently, thereby causing deterioration of sensitivity of the solid-state imaging device. That is, the sensitivity of the solid-state imaging device has a characteristic depending on the F-number of the imaging lens.

This is because there is a distance between a light incidence surface of each photodiode formed in a semiconductor substrate and a micro-lens formed thereabove, for example, as described in the following Patent Literatures 1 and 2. That is, even when oblique incident light enters the micro-lens in the upper layer, the incident light cannot reach the photodiode in the lower layer sufficiently.

For this reason, when an image of a photographic subject is taken by an imaging apparatus, data of the image of the photographic subject are corrected based on information about F-number dependence of sensitivity of a solid-state imaging device mounted in the imaging apparatus.

PRIOR ART DOCUMENTS

Patent Literature

Patent Literature 1: JP-A-2002-185822
Patent Literature 2: JP-A-2002-232772

SUMMARY OF INVENTION

Technical Problem to be Solved by the Invention

In the case of a compact type imaging apparatus (digital camera), an imaging lens integral type is commonly used so that correction may be performed based on data of characteristic of the imaging lens and data of F-number dependence of sensitivity of a solid-state imaging device.

However, in recent years, lens-interchangeable type digital cameras have been increasing. There arises a problem that exposure deviation occurs when one lens is interchanged with another. Particularly, in a lens-interchangeable type imaging apparatus called mirrorless interchangeable-lens camera, the size of an image sensor is small and an interchangeable lens is also made compact. It is therefore difficult to reduce a diaphragm error and a brightness error. Ordinarily, the diaphragm error and the brightness error vary from one interchangeable lens to another. Even when an exposure correction quantity set for a certain interchangeable lens is applied to another interchangeable lens having the same design F-number, exposure deviation still occurs.

An object of the invention is to provide an imaging apparatus, a control method of the imaging apparatus, an interchangeable lens, and a lens-interchangeable type imaging apparatus body, by which an image of a photographic subject with a small exposure deviation can be taken even in a lens-interchangeable type.

Means for Solving the Problem

An imaging apparatus according to the invention is an imaging apparatus having: a lens-interchangeable type imaging apparatus body which includes a solid-state imaging device; and an interchangeable lens which is detachably mounted on the lens-interchangeable type imaging apparatus body and which uses a diaphragm to adjust incident light from a photographic subject and uses a lens system to form an image of the incident light on a light receiving surface of the solid-state imaging device; characterized in that: the interchangeable lens is provided with a first storage portion which stores individual difference information about brightness of the interchangeable lens; and the lens-interchangeable type imaging apparatus body is provided with a second storage portion which stores information about a change of incident light sensitivity of the solid-state imaging device relative to each diaphragm value, and a control portion which uses the individual difference information about the brightness read from the first storage portion of the mounted interchangeable lens and the information about the change of the sensitivity in the second storage portion to thereby correct exposure at the time of imaging the photographic subject.

An interchangeable lens according to the invention is characterized by being the aforementioned interchangeable lens.

A lens-interchangeable type imaging apparatus body according to the invention is characterized by being the aforementioned lens-interchangeable type imaging apparatus body.

A control method of an imaging apparatus according to the invention is a control method of an imaging apparatus provided with: a lens-interchangeable type imaging apparatus body which includes a solid-state imaging device; and an interchangeable lens which is detachably mounted on the lens-interchangeable type imaging apparatus body and which uses a diaphragm to adjust incident light from a photographic subject and uses a lens system to form an image of the incident light on a light receiving surface of the solid-state imaging device, the method being characterized by including: using individual difference information about brightness of the mounted interchangeable lens read from a storage portion of the interchangeable lens and information about a change of incident light sensitivity of the solid-state imaging device relative to each diaphragm value stored in a storage portion of the lens-interchangeable type imaging apparatus body to thereby correct exposure at the time of imaging the photographic subject.

Advantageous Effects of Invention

According to the invention, an imaging gain can be corrected properly without being affected by the individual difference of the lens and F-number dependence of the sensitiv-

EMBODIMENTS FOR CARRYING OUT THE INVENTION

An embodiment of the invention will be described below with reference to the drawings.

Figure 1:
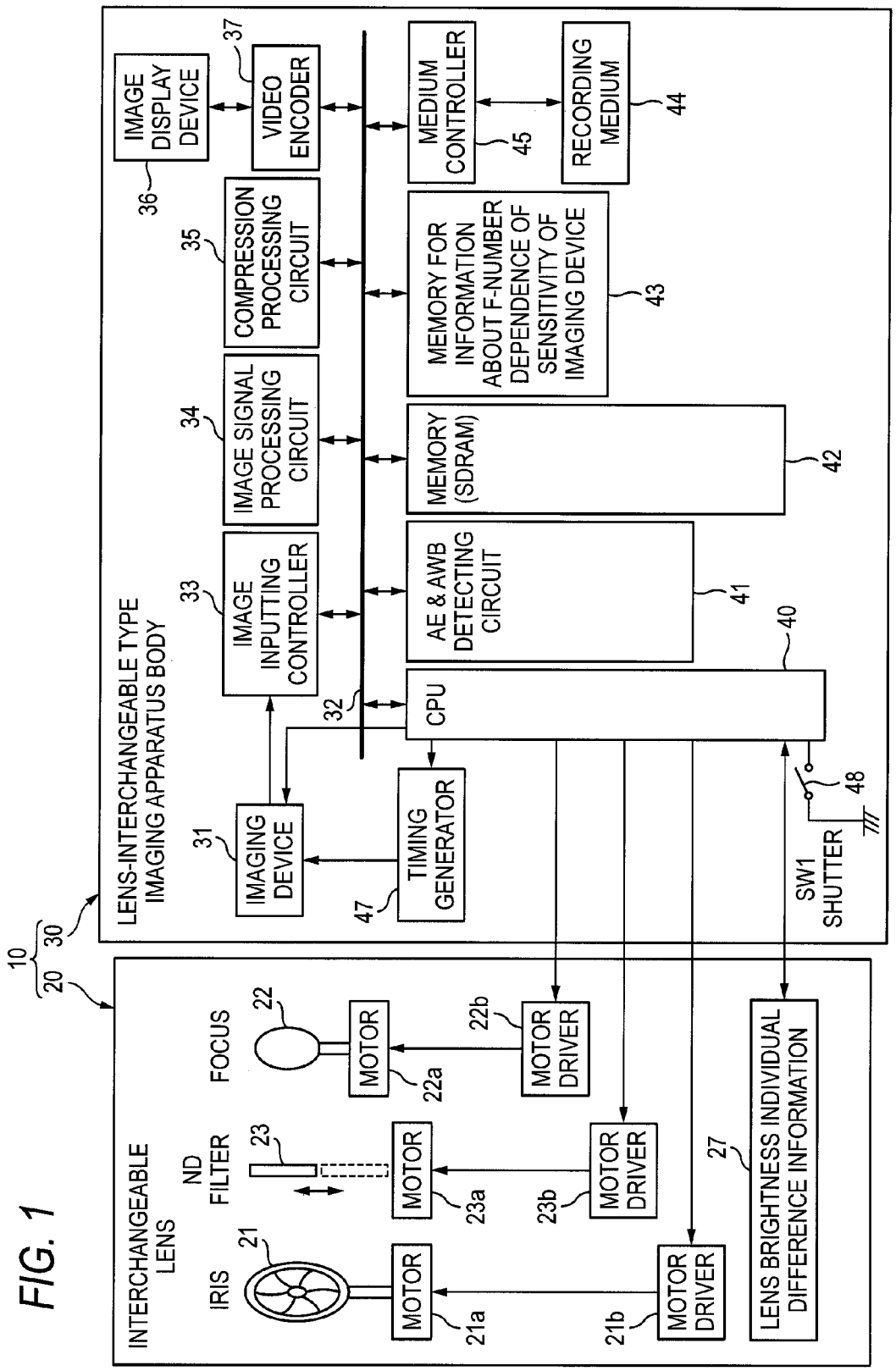
FIG. 1 A block diagram of a functional configuration of an imaging apparatus according to a first embodiment of the invention.

FIG. 1 is a diagram of functional blocks of a lens-interchangeable type imaging apparatus according to a first embodiment of the invention. The lens-interchangeable type imaging apparatus 10 includes an interchangeable lens 20, and an imaging apparatus body (imaging apparatus body) 30. The lens-interchangeable type imaging apparatus 10 is configured in such a manner that the interchangeable lens 20 desired by a user such as a wide-angle imaging system interchangeable lens 20 or a telephoto imaging system interchangeable lens 20 is mounted on the imaging apparatus body 30.

The interchangeable lens 20 includes a diaphragm (iris) 21, a focus lens 22, and a neutral density (ND) filter 23. In addition, when the interchangeable lens 20 is of the wide-angle imaging system, a not-shown wide angle lens is built in front of the diaphragm 21. When the interchangeable lens 20 is of the telephoto imaging system, a not-shown telephoto lens is built in front of the diaphragm 21.

The diaphragm 21 is driven by a motor 21a so that the position of the diaphragm can be changed. The motor 21a is driven by a motor driver 21b. The motor driver 21b is driven in accordance with an instruction from a CPU 40. The CPU 40 is provided inside the imaging apparatus body 30 and will be described later. The diaphragm 21 according to the embodiment is a diaphragm blade type. The diaphragm 21 is configured to control the aperture size (aperture diameter) to thereby control the quantity of incident light onto an imaging device 31.

The focus lens 22 is driven by a motor 22a. The motor 22a is driven by a motor driver 22b. When the CPU 40 issues an instruction to the motor driver 22b, the focus lens 22 is driven to form an image of incident light on a light receiving surface of the imaging device 31. The imaging device 31 is provided inside the imaging apparatus body 30 and will be described later.

The ND (neutral density) filter 23 is driven by a motor 23a to be able to be inserted/retracted on/from an incident optical path. The motor 23a is driven by a motor driver 23b. The insertion/retraction of the ND filter 23 is controlled in accordance with an instruction from the CPU 40.

An ROM is built in the interchangeable lens 20. Individual difference information 27 about the brightness of the interchangeable lens 20 is stored in the ROM. When the interchangeable lens 20 is mounted on the imaging apparatus body 30, the CPU 40 inside the imaging apparatus body 30 reads the individual difference information 27 about the brightness of the lens, and uses the individual difference information 27 to perform exposure control on a photographic subject and gain correction on a taken image signal in a manner which will be described later.

For example, a CMOS type solid-state imaging device 31 is disposed in the imaging apparatus body 30 in a position where an image of incident light passing through the focus lens 22 can be formed. It is a matter of course that the solid-state imaging device may be of another type such as a CCD type.

Further, the imaging apparatus body 30 is provided with an image inputting controller 33 which imports an output image signal of the solid-state imaging device 31 and outputs the output image signal to a bus 32. An image signal processing circuit 34, a compression processing circuit 35, a video encoder 37, the CPU 40, a circuit 41, a main memory 42, a memory 43, and a medium controller 45 are connected to the bus 32. The image signal processing circuit 34 performs well-known image processing on the output image signal of the solid-state imaging device 31. The compression processing circuit 35 compresses the image signal which has been subjected to image processing, into JPEG image data etc. The video encoder 37 displays a taken image or a through image on an image display device 36 provided in the back etc., of the imaging apparatus body 30. The CPU 40 comprehensively controls the lens-interchangeable type imaging apparatus 10. The circuit 41 processes a signal outputted as a through image (live-view image) from the solid-state imaging device 31, and detects automatic exposure (AE) and automatic white balance (AWB). The memory 43 stores data of F-number dependence of sensitivity of the solid-state imaging device 31. The medium controller 45 stores the JPEG image data into a recording medium 44. Incidentally, the data of the F-number dependence in the memory 43 may be alternatively stored in a storage region ensured in the memory 42.

The solid-state imaging device 31 is driven in accordance with a timing signal from a timing generator 47. The timing generator 47 operates in accordance with an instruction from the CPU 40. A shutter release button (shutter switch) 48 provided in the imaging apparatus body 30 is connected to the CPU 40.

The individual difference information 27 about the brightness of the lens stored in the interchangeable lens 20 side means information indicating whether the brightness of the lens 20 is deviated from a design value or not. For example, a lens designed to have a design F-number of 2.0 may have an F-number of 2.01 due to an individual difference.

When the aperture diameter of the diaphragm 21 is mechanically controlled to be an aperture diameter establishing the relation F-number=2.0, the aperture diameter may be slightly narrow or wide due to an error (clearance) of a mechanical portion etc. The size of the error of the mechanical portion may vary between when the aperture diameter of the diaphragm is driven in an open aperture direction and when the aperture diameter of the diaphragm is driven in a small aperture direction.

Or when lenses are made of the same material, transmittances of these lenses may also contain individual differences. In the case of the lens 20 having the ND filter 23, the light reduction rate of the ND filter may contain an individual difference.

When the level of the error of the brightness of the lens based on such an individual difference is inspected in advance in an inspection at the time of manufacturing the interchangeable lens 20, information about a transmittance error of transmittance indicating light reduction characteristic of the interchangeable lens is stored in advance in the individual difference information memory 27.

The data about the F-number dependence of the sensitivity of the solid-state imaging device 31 may be previously obtained in an inspection at the time of manufacturing the solid-state imaging device 31. For example, reference light in an inspection chamber of a factory manufacturing the solid-state imaging device 31 passes through the imaging lens optical system to obtain the data about the F-number dependence of the sensitivity in the form of data.

For example, when the sensitivity of the imaging device at the time of reference F-number=2.0 is set as reference sensitivity, an error of the sensitivity of the imaging device at the time of reference F-number=2.8 relative to the reference sensitivity, an error of the sensitivity of the imaging device at the time of reference F-number=4.0 relative to the reference sensitivity, etc. are formed as data. The thus formed data about the F-number dependence are stored in the memory 43 of the imaging apparatus body 30 mounted with the solid-state imaging device 31.

Figure 2:
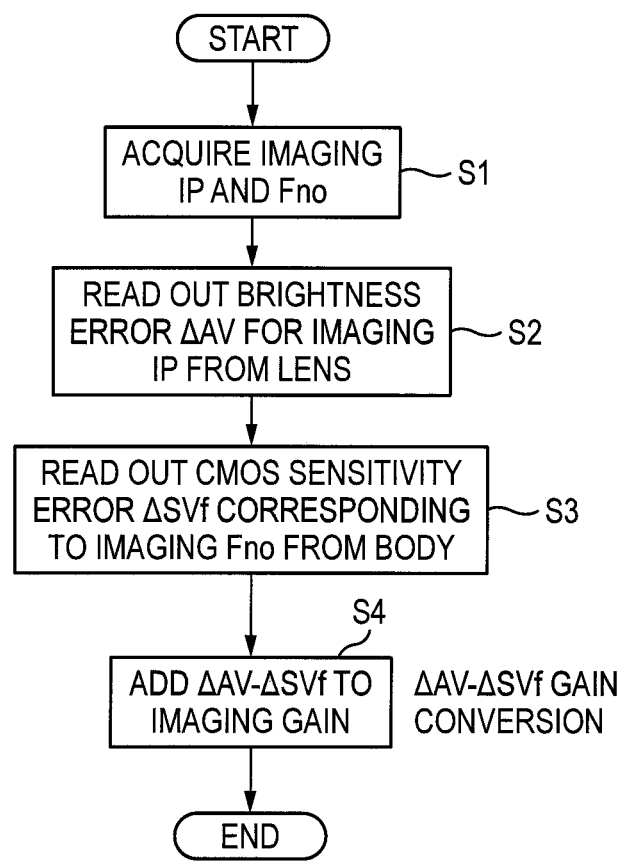
FIG. 2 A flow chart showing a processing procedure according to the first embodiment of the invention.

FIG. 2 is a flow chart showing a processing procedure for performing exposure correction using the individual difference information 27 stored in the ROM of the interchangeable lens 20 and the data about the F-number dependence of the sensitivity of the imaging device stored in memory 43, which flow chart is executed by the CPU 40 in FIG. 1.

In FIG. 2, in a step S1, first, the CPU 40 acquires information about the position (iris position IP) of the diaphragm 21 at the time of imaging a photographic subject and the F-number of the interchangeable lens 20 at the time of imaging.

In a next step S2, the CPU 40 retrieves the individual difference information 27 to read information about a lens brightness error corresponding to the information about the diaphragm position acquired in the step S1. Since lens brightness errors $\Delta Av$ corresponding to step numbers of diaphragm positions are stored in the individual difference information 27, the CPU 40 reads out a lens brightness error $\Delta Av$ corresponding to the step number of the diaphragm position.

In each of the diaphragm positions, the relation among an effective Av value, a design Av value, and the lens brightness error $\Delta Av$ is expressed as follows.

"Effective $Av$=Design $Av$+Diaphragm Error $\Delta Av$"

In a next step S3, the CPU 40 retrieves the memory 43 to obtain a sensitivity error of the imaging device corresponding to the F-number of the interchangeable lens 20 acquired in the step S1. On the assumption that the sensitivity error of the imaging device 31 in the F-number at the time of imaging is $\Delta SVf$, the relation in the F-number at the time of imaging is obtained as follows.

"Effective Sensitivity=Sensitivity in Reference $F$-Number+$\Delta SVf$".

In a next step S4, "$\Delta Av-\Delta SVf$" is obtained and added to an imaging gain G to perform exposure correction. Then, the process is terminated. Incidentally, dimensions for the value $\Delta Av$ and the value $\Delta SVf$ are equalized to obtain $\Delta Av-\Delta SVf$. Again conversion equation for obtaining a gain error $\Delta G$ when the exposure correction is performed is obtained as follows.

$\Delta G=\Delta Av-\Delta SVf$

When $\Delta G$ in the equation is expressed by decibel (dB), the following relation is obtained.

$\Delta \text{Gain}(dB)=20\times\Delta G\times\log 2$

Incidentally, the base of the logarithm here is "10".

In this manner, according to the embodiment, the data about the lens brightness error are stored in advance in the interchangeable lens 20 side and the data about the F-number dependence of the sensitivity of the imaging device 31 are stored in advance in the imaging apparatus body 30 side so that exposure correction can be performed using the both error information at the time of imaging. Therefore, it is possible to take an excellent image with no exposure deviation even when the imaging lens is interchanged with another imaging lens.

Incidentally, the value $\Delta Av$ and the value $\Delta SVf$ stored in advance in the memories 27 and 43 may be stored in advance simply as deviation quantities or may be stored in advance as values of correction coefficients practically used for calculation of exposure correction.

Figure 3:
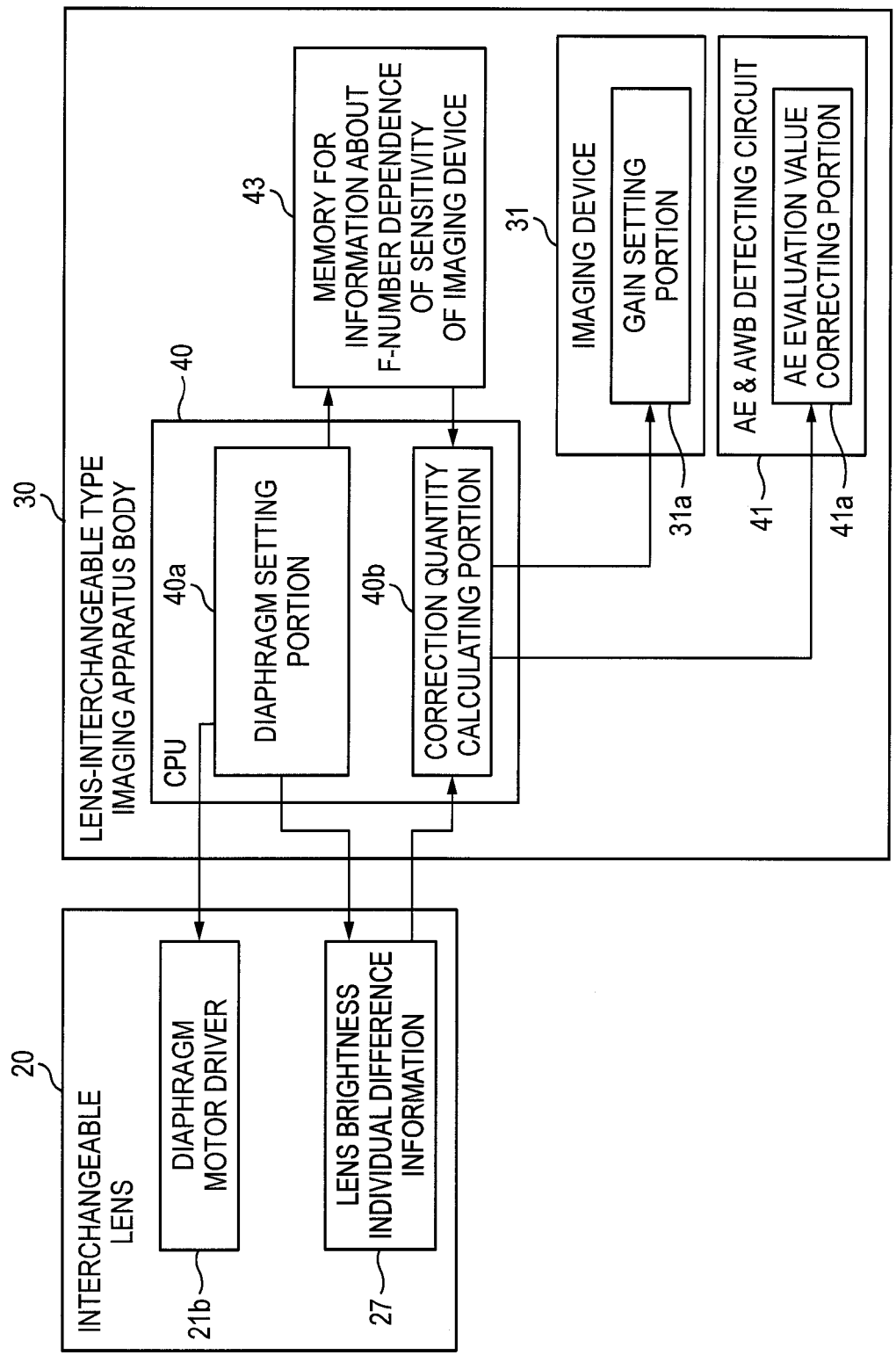
FIG. 3 A diagram of a functional configuration of a main part of an imaging apparatus according to a second embodiment of the invention.

FIG. 3 is a diagram of a functional block configuration according to a second embodiment of the invention. FIG. 3 is a view in which only functional blocks relevant to an exposure correction process are extracted from the configuration blocks shown in FIG. 1.

The CPU 40 is provided with a diaphragm setting portion 40a and a correction quantity calculating portion 40b. Setting information of the diaphragm setting portion 40 is transmitted to the diaphragm motor driver 21b and the memory where the individual difference information 27 about the lens brightness is stored. The individual difference information about the lens brightness corresponding to the diaphragm setting information is read out and outputted to the correction quantity calculating portion 40b.

In addition, the aforementioned diaphragm setting information is also outputted to the memory 43 from the diaphragm setting portion 40a and the data about the F-number dependence of the sensitivity of the imaging device 31 corresponding to the diaphragm setting information is read out and outputted to the correction quantity calculating portion 40b.

A calculation result of the correction quantity calculating portion 40b is outputted to a gain setting portion 31a of the imaging device 31 and an AE evaluation value correcting portion 41a of the automatic exposure (AE) and automatic white balance (AWB) detecting circuit 41.

In the embodiment, the configuration in which the calculation result of the correction quantity calculating portion 40b is also outputted to the AE evaluation value correcting portion 41a in FIG. 3 is an additional portion to the configuration carrying out the embodiment of FIG. 2.

Figure 4:
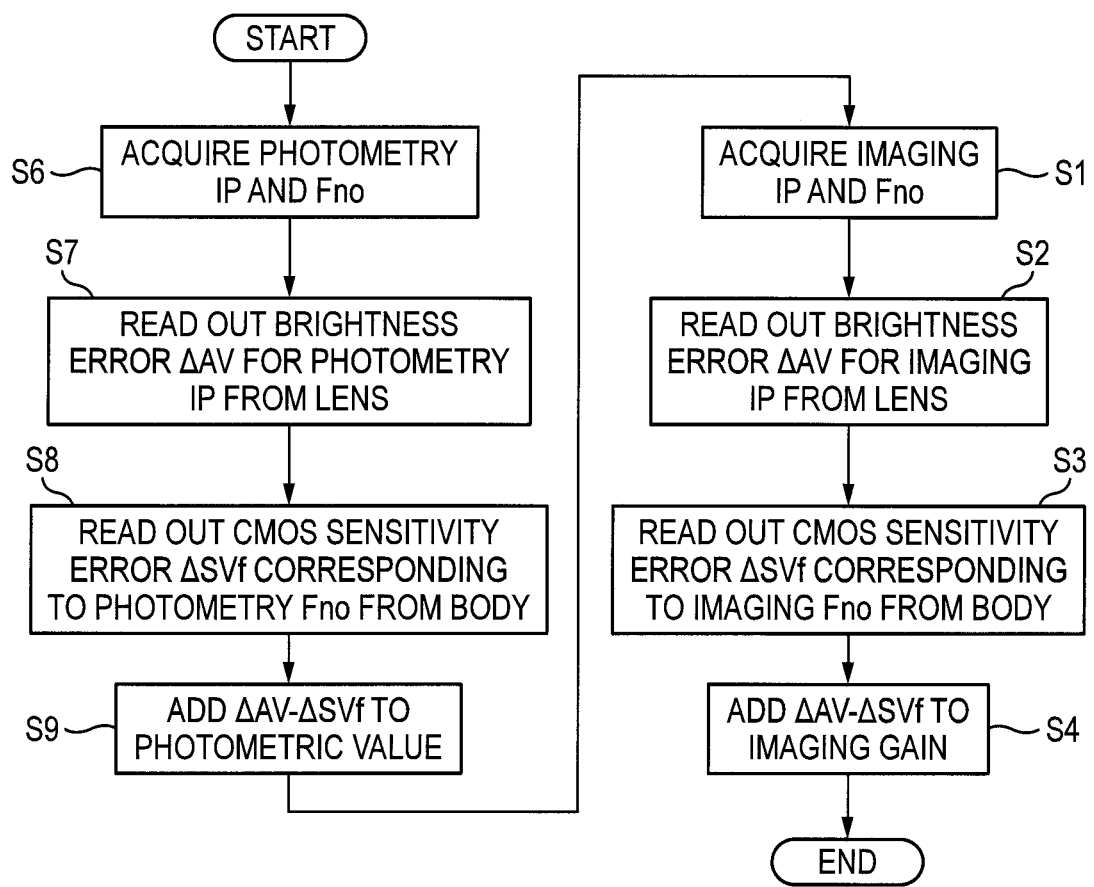
FIG. 4 A flow chart showing a processing procedure according to the second embodiment of the invention.

FIG. 4 is a flow chart showing a processing procedure in the embodiment of FIG. 3. In the processing procedure, steps S6 to S9 are added before the process of the steps S1, S2, S3 and S4 described in FIG. 2 is started.

First, in the step S6, information about the position (iris position IP) of the diaphragm 21 at the time of photometry and the F-number of the interchangeable lens 20 at the time of photometry are acquired.

In the next step S7, the CPU 40 retrieves the individual difference information 27 to read out information about a lens brightness error corresponding to the information about the diaphragm position acquired in the step S6. This process is the same as the process of the step S2 in FIG. 2.

In the next step S8, the CPU 40 retrieves the memory 43 to search for the data about the F-number dependence to thereby obtain a sensitivity error of the imaging device corresponding to the F-number of the interchangeable lens 20 acquired in the step S6. This process is the same as the process described in the step S3 in FIG. 2. In the next step S9, "$\Delta Av - \Delta SVf$" is obtained and added to a photometric value so that the AE evaluation value correcting portion 41a in FIG. 3 corrects the photometric quantity. Hereinafter, the steps S1, S2, S3 and S4 described in FIG. 2 are executed in the named order to correct the gain of the imaging device 31.

In this manner, according to the embodiment, even when the imaging lens 20 is interchanged with another, photometric deviation caused by the interchange of the lens is not generated in an AE evaluation value at the time of photometry so that an excellent image can be taken, in addition to the effect of the first embodiment.

Figure 5:
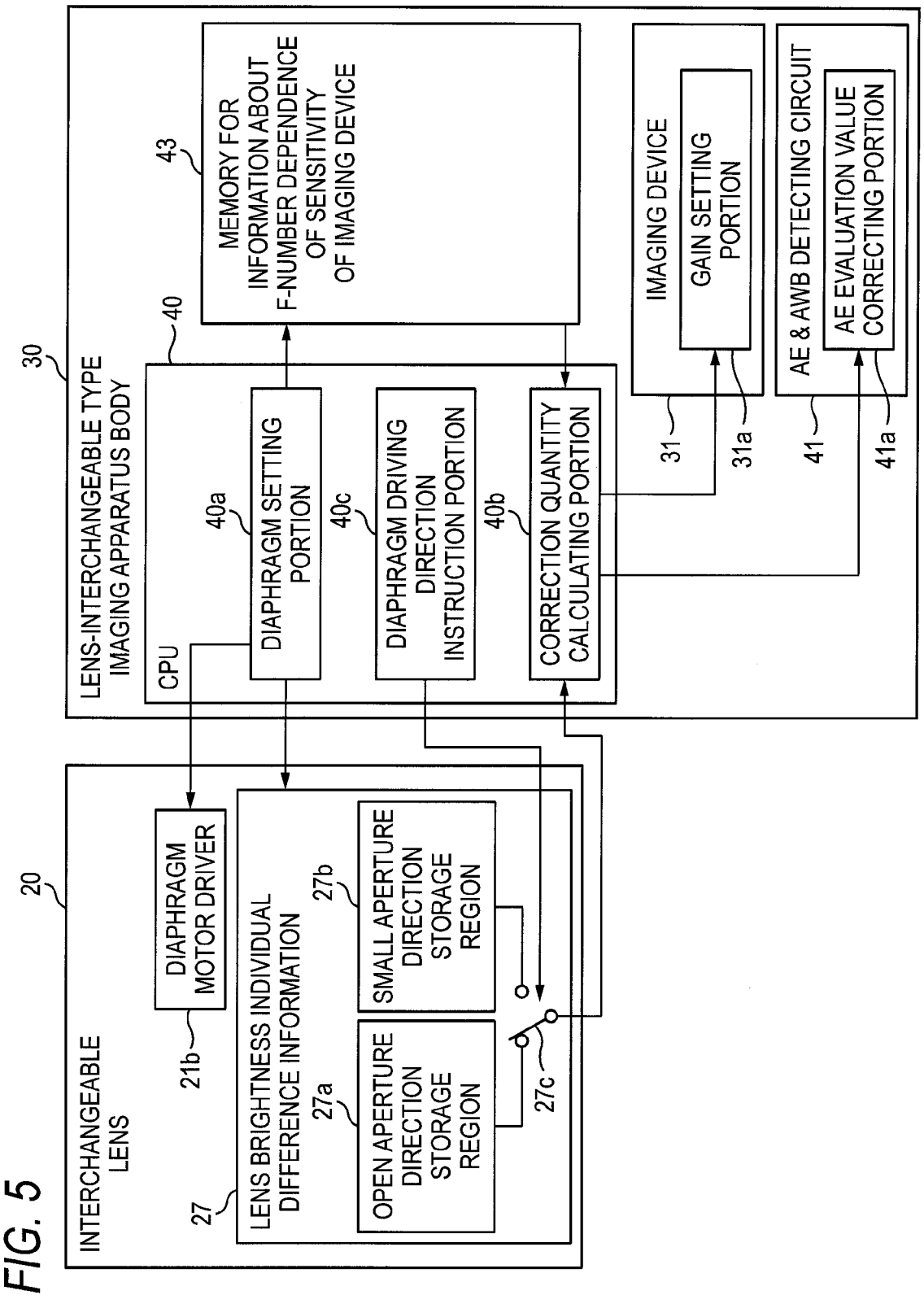
FIG. 5 A diagram of a functional configuration of a main part of an imaging apparatus according to a third embodiment of the invention.

FIG. 5 is a diagram of a functional block configuration according to a third embodiment of the invention. FIG. 5 is a view in which only functional blocks relevant to an exposure correction process are extracted from the configuration blocks shown in FIG. 1. In comparison with the second embodiment in FIG. 3, the third embodiment is different in the following point.

The lens brightness individual difference information 27 provided in the interchangeable lens 20 is classified into pieces of individual difference information in accordance with driving directions of the diaphragm 21 respectively.

That is, the lens brightness individual difference information 27 is classified into a storage region 27a which stores brightness individual difference information when the diaphragm 21 changes to an open aperture direction, and a storage region 27b which stores brightness individual difference information when the diaphragm 21 changes to a small aperture direction. Configuration is made in such a manner that one of the storage regions 27a and 27b is selected by means of a changeover switch 27c and the corresponding lens brightness individual difference information is outputted to the correction quantity calculating portion 40b of the CPU 40.

A driving direction instruction portion 40c for the diaphragm 21 is provided in the CPU 40. The changeover switch 27c is driven to be changed over in accordance with an instruction of the driving direction instruction portion 40c.

Figure 6:
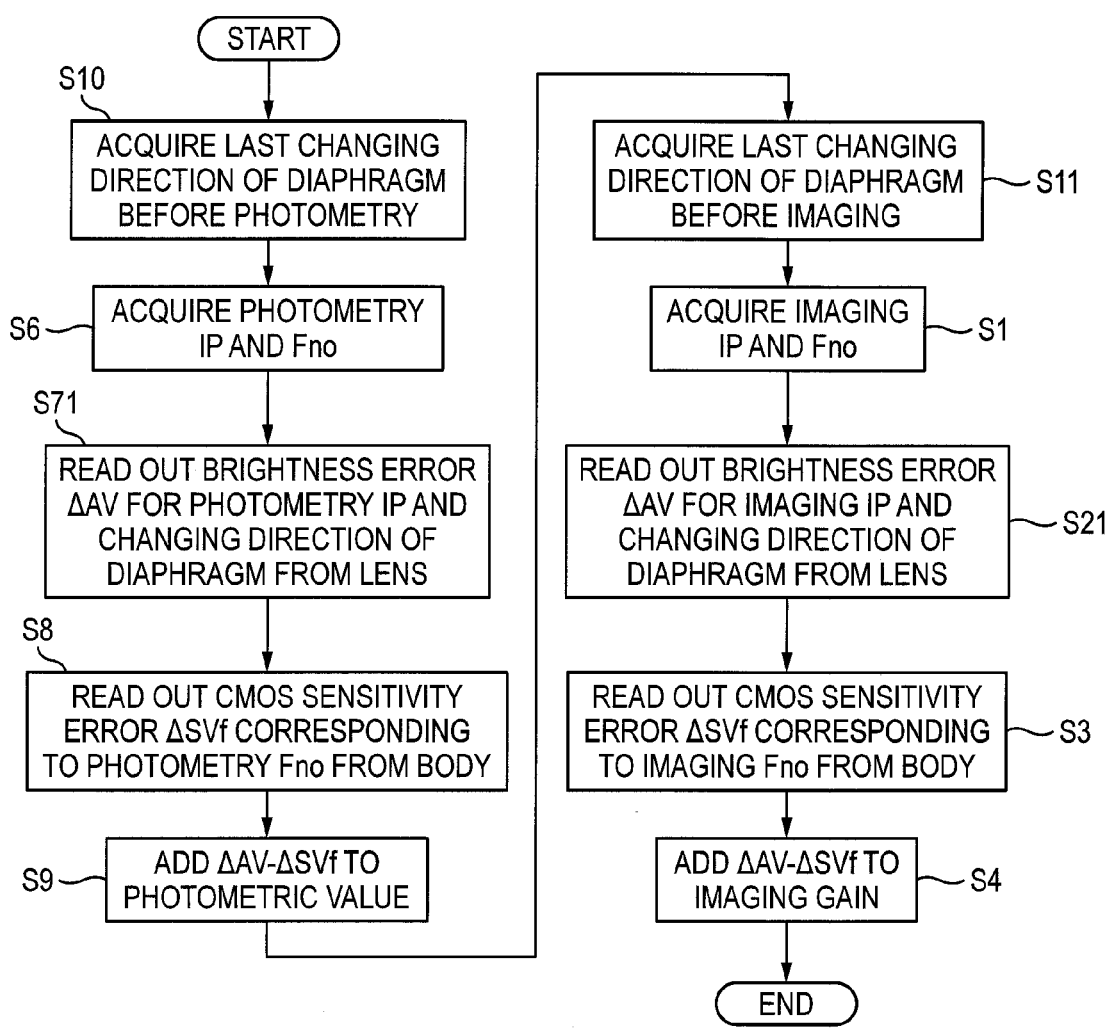
FIG. 6 A flow chart showing a processing procedure according to the third embodiment of the invention.

FIG. 6 is a flow chart showing a processing procedure in the embodiment of FIG. 5. In comparison with the processing procedure of FIG. 4, the process of the steps S1, S3, S4, S6, S8 and S9 is the same, a step S21 is performed in place of the step S2 and a step S71 is performed in place of the step S7. A step S10 is performed in front of the step S6 and a step S11 is performed between the step S9 and the step S1.

In the initial step S10, instruction information of the last changing direction of the diaphragm 21 before photometry is acquired. Next, the aforementioned step S6 is executed. In the next step S71, one of the storage regions 27a and 27b is selected in accordance with the changing direction of the diaphragm 21 and lens brightness error information $\Delta Av$ corresponding to the diaphragm position at the time of photometry is read out from the selected storage region.

The flow of processing advances to the aforementioned steps S8 and S9. In the next step S11, instruction information of the last changing direction of the diaphragm before imaging is acquired this time in the same manner as in the step S10. Then, the flow of processing advances to the step S1. In the next step S21, one of the storage regions 27a and 27b is selected in accordance with the changing direction of the diaphragm 21 in the same manner as in the step S71 and the lens brightness error information $\Delta Av$ corresponding to the diaphragm position at the time of photometry is read out from the selected storage region. Next, the flow of processing advances to the steps S3 and S4. Then, the process is terminated.

According to the embodiment, it is also possible to cope with the case where a mechanical clearance is provided in the diaphragm 21 and an error varies between when the diaphragm 21 changes to the open aperture direction and when the diaphragm 21 changes to the small aperture direction. Thus, it is possible to perform proper AE evaluation and exposure correction.

Figure 7:
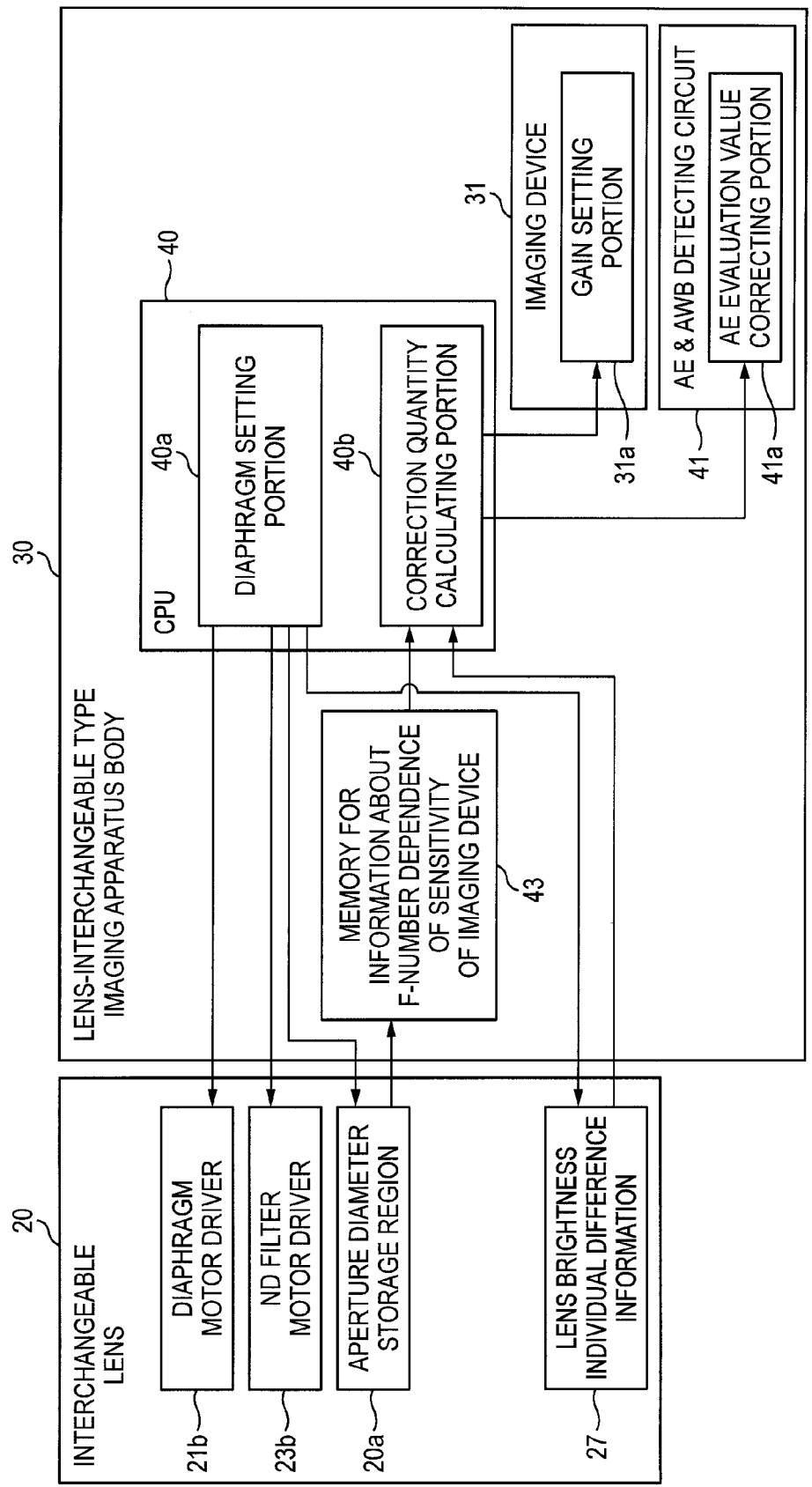
FIG. 7 A diagram of a functional configuration of a main part of an imaging apparatus according to a fourth embodiment of the invention.

FIG. 7 is a functional block diagram according to a fourth embodiment of the invention. FIG. 7 is a view in which only functional blocks relevant to an exposure correction process are extracted from the configuration blocks shown in FIG. 1. In comparison with the embodiment in FIG. 3, FIG. 7 is different in a point that an instruction from the diaphragm setting portion 40a of the CPU 40 is also outputted to the ND filter motor driver 23b, a point that information about the aperture diameter of the diaphragm 21 instructed from the diaphragm setting portion 40a is stored in a temporary storage region 20a inside the lens 20, and a point that the memory 43 for the information about the F-number dependence of the sensitivity of the imaging device 31 is retrieved by use of the information about the aperture diameter read out from the temporary storage region 20a.

When an imaging scene is bright and the quantity of incident light rays cannot be sufficiently adjusted only by the diaphragm 21, the ND filter 23 is inserted on the incident optical path to reduce the light. The F-number dependence of the sensitivity of the imaging device 31 is affected only by the aperture diameter of the diaphragm 21 without depending on the adjusting quantity (light reduction quantity) caused by the neutral density (ND) filter 23. Therefore, configuration is made so that the information only about the diaphragm diameter is stored in the temporary storage region 20a and the memory 43 is retrieved by use of the information about the diaphragm diameter.

In the case of the embodiment, the light reduction caused by the ND filter 23 is used together with the light reduction caused by the diaphragm 21. The ND filter 23 contains an individual difference and the light reduction rate of the ND filter 23 varies individually. Accordingly, ND filter-excluding individual difference information and ND filter-including individual difference information are prepared as the lens brightness individual difference information 27. When the ND filter 23 is used, a corresponding value $\Delta Av$ is outputted from the ND filter-including individual difference information to the correction quantity calculating portion 40b.

Figure 8:
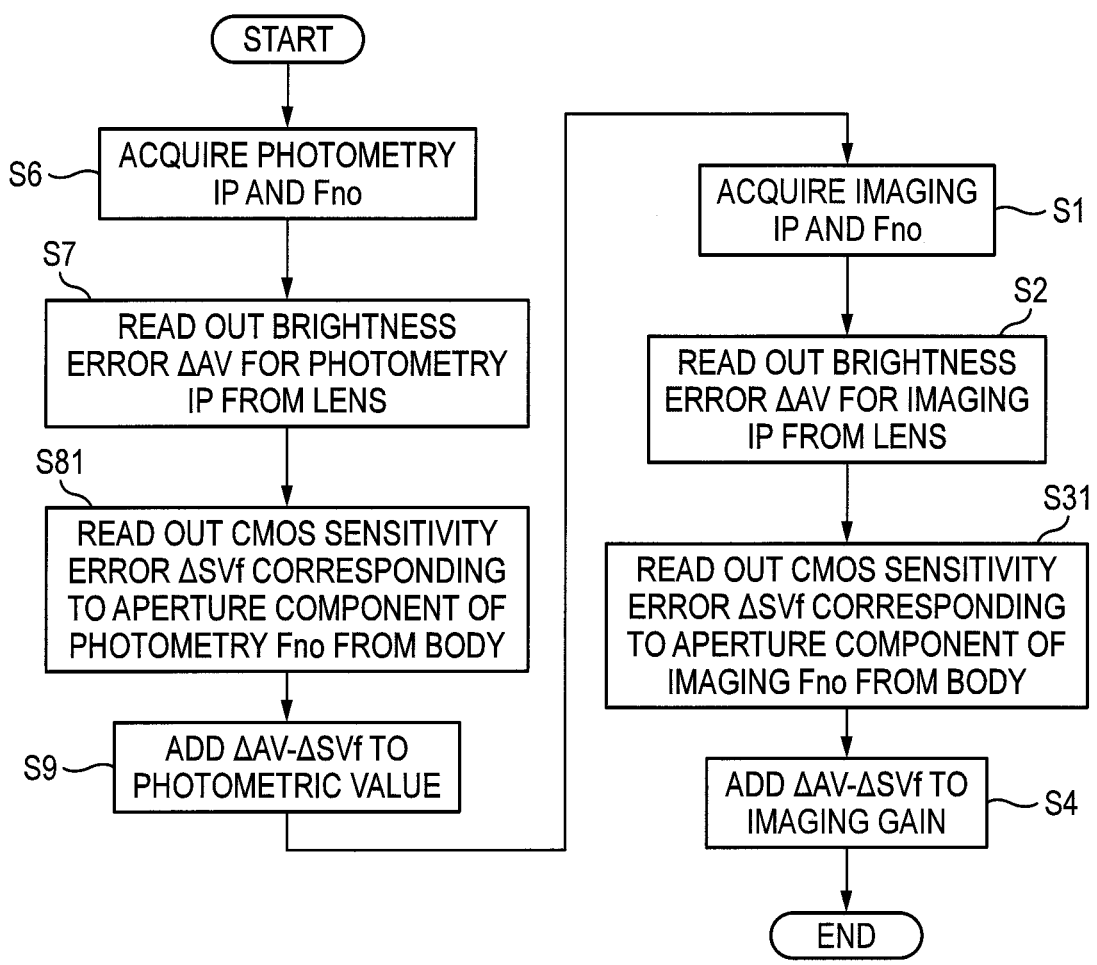
FIG. 8 A flow chart showing a processing procedure according to the fourth embodiment of the invention.

FIG. 8 is a flow chart showing a processing procedure in the embodiment of FIG. 7. In comparison with the processing procedure of the embodiment in FIG. 4, FIG. 8 is the same in the steps S1, S2, S4, S6, S7 and S9 but different in a point that a step S81 is executed in place of the step S8 and a step S31 is executed in place of the step S3.

As described above, the sensitivity error of the imaging device 31 depends only on an incidence angle component of the incident light rays without being affected by a light reduction component of the ND filter. Therefore, in the step S81 or S31, the memory 43 is retrieved by use of an aperture component of the diaphragm, that is, the information about the aperture diameter read out from the temporary storage region 20a so that corresponding ΔSVf can be read out.

According to the aforementioned fourth embodiment, even in the case where the lens is interchanged with an imaging lens mounted with an ND filter and the ND filter is in use, an accurate AE evaluation value can be obtained so that proper exposure correction can be performed.

Figure 9:
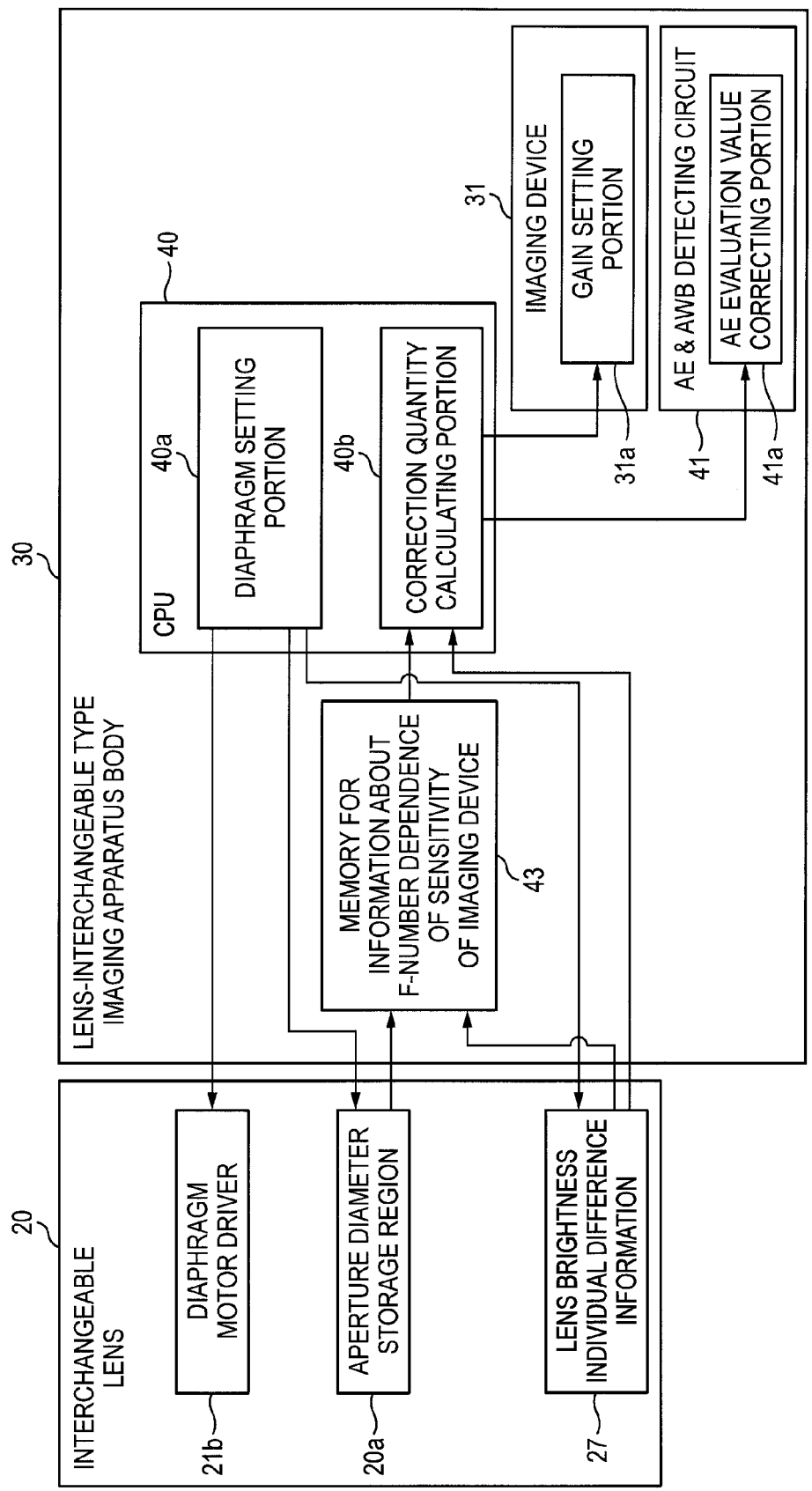
FIG. 9 A diagram of a functional configuration of a main part of an imaging apparatus according to a fifth embodiment of the invention.

FIG. 9 is a functional block diagram according to a fifth embodiment of the invention. FIG. 9 is a view in which only functional blocks relevant to an exposure correction process are extracted from the configuration blocks shown in FIG. 1. In comparison with the embodiment of FIG. 3, FIG. 9 is different in a point that the information about the aperture diameter from the diaphragm setting portion 40a of the CPU 40 is stored in a temporary storage region 20a inside the lens 20, and a point that the memory 43 for the information about the F-number dependence of the sensitivity of the imaging device 31 is retrieved by use of the aperture diameter read out from the temporary storage region 20a and the lens brightness individual difference information 27.

Figure 10:
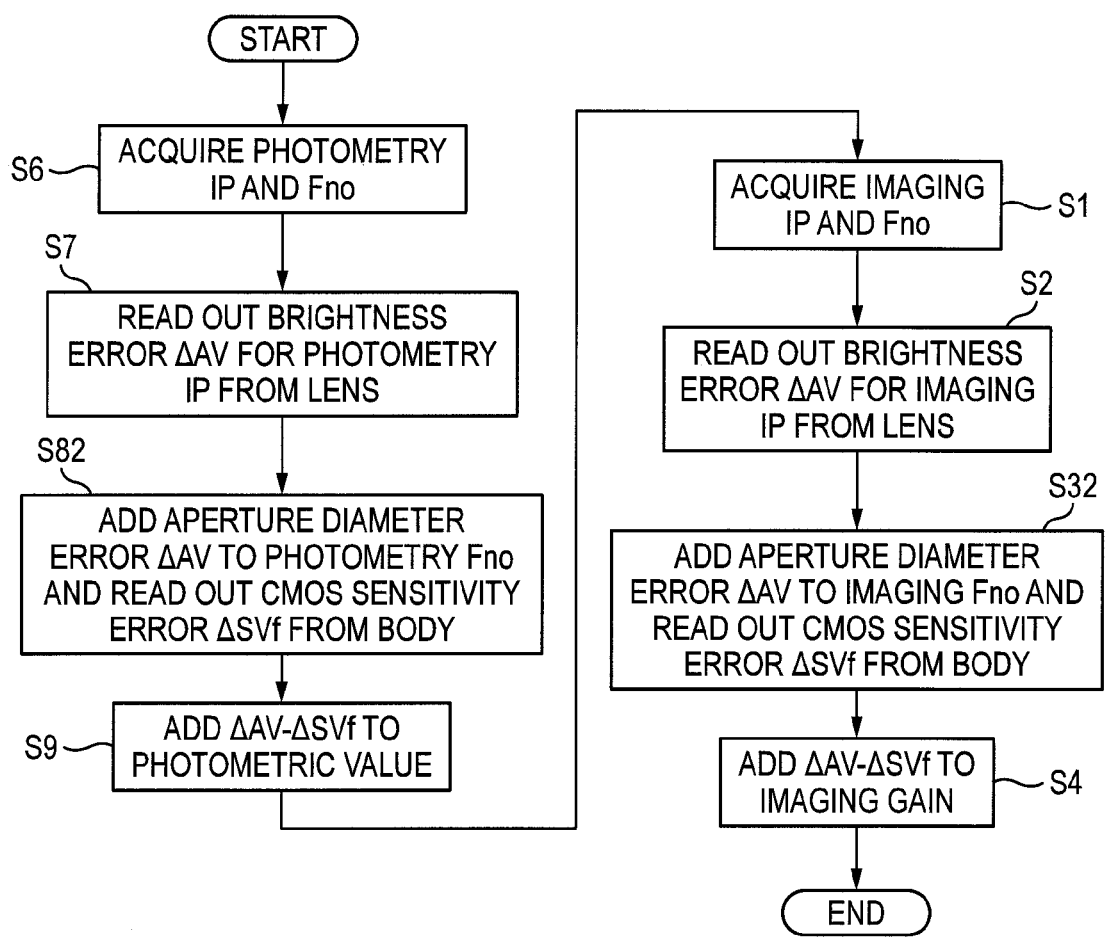
FIG. 10 A flow chart showing a processing procedure according to the fifth embodiment of the invention.

FIG. 10 is a flow chart showing a processing procedure in the embodiment of FIG. 9. In comparison with the processing procedure of the embodiment in FIG. 4, FIG. 10 is the same in the steps S1, S2, S4, S6, S7 and S9 but different in a point that a step S82 is executed in place of the step S8 and a step S32 is executed in place of the step S3.

In the embodiment, when the sensitivity error information ΔSVf of the solid-state imaging device is retrieved in the step S82 or S32, the retrieval is performed using both the F-number information at the time of photometry or at the time of imaging and the lens brightness error information.

The relation is expressed as "Lens Brightness Error (ΔAv) =Aperture Diameter Error (ΔAvi)+Lens Transmittance Error+ND Filter Transmittance Error". In the step S7 or S2, the lens brightness error ΔAv is read out. However, in the step S82 or S32, the aperture diameter error ΔAvi in the ΔAv information is added to the F-number at the time of photometry or at the time of imaging so that the F-number is obtained in the following Math. 1.

$$F\text{-number}=2^{\{(design\ Av+\Delta Avi)/2\}} \quad [\text{Math. 1}]$$

ΔSVf corresponding to the F-number is read out from the memory 43 to be used. Of course, it is assumed that the lens brightness individual difference information 27 has been stored after classified into the aperture diameter error ΔAvi, the lens transmittance error and the ND filter transmittance error.

According to the embodiment, even when there is a condition that the aperture diameter error in the imaging lens is large, the F-number at the time of photometry or at the time of imaging is also tinged with the aperture diameter to determine ΔSVf. Accordingly, an AE evaluation value can be obtained with high accuracy and exposure correction at the time of imaging can be performed with high accuracy regardless of whether the lens is interchanged with another or not.

Figure 11:
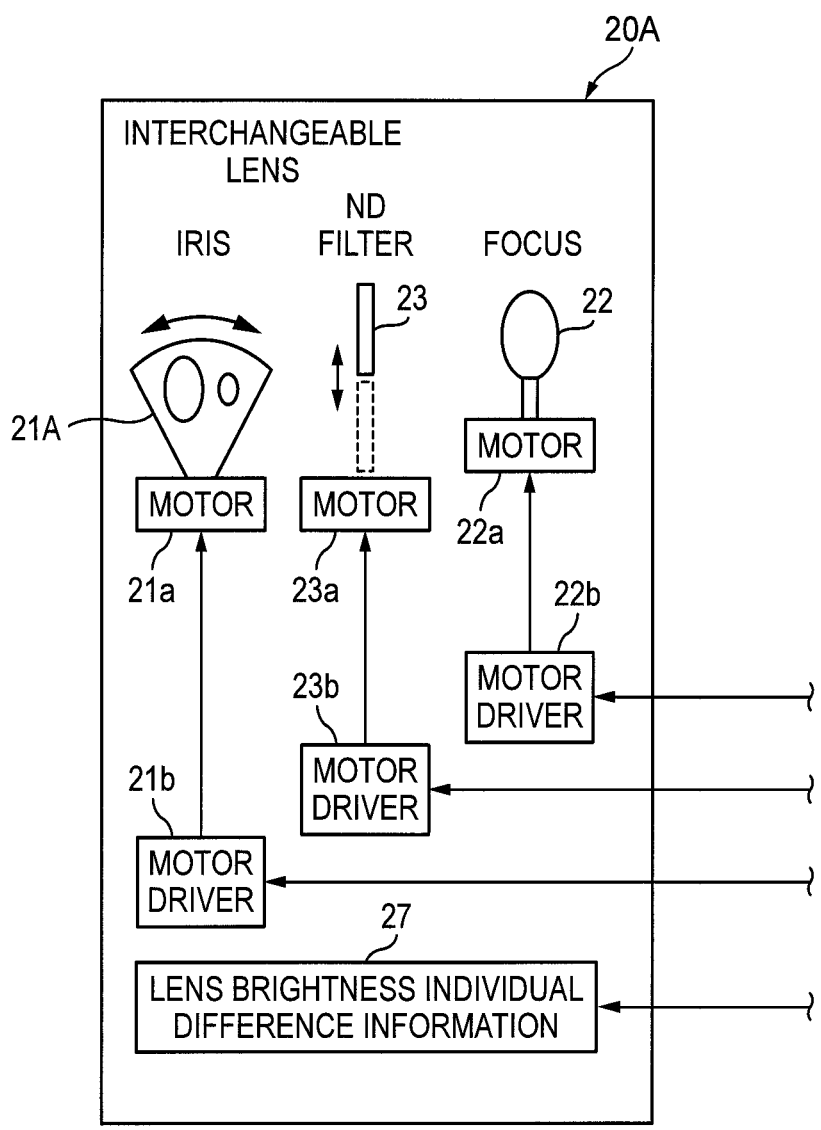
FIG. 11 A block diagram of a functional configuration according to another embodiment of an interchangeable lens shown in FIG. 1.

FIG. 11 is a view of a functional configuration according to another embodiment of an interchangeable lens 20A. The diaphragm blade type is used as the diaphragm 21 in the interchangeable lens 20 shown in FIG. 1. However, the invention is not limited to the diaphragm blade type but may be also applied to a diaphragm 21A including a plurality of holes made on the circumference of one and the same circle to have different opening diameters, like a diaphragm 21A shown in FIG. 11. Since it is difficult to make holes with different opening diameters in any diaphragm 21A with no individual differences, information about machining accuracy of the opening diameters may be stored in advance as the lens brightness individual difference information 27. Incidentally, another embodiment than the embodiment of FIG. 5 may be also applied to the interchangeable lens 20A.

As described above, an imaging apparatus according to an embodiment is an imaging apparatus having: a lens-interchangeable type imaging apparatus body which includes a solid-state imaging device; and an interchangeable lens which is detachably mounted on the lens-interchangeable type imaging apparatus body and which uses a diaphragm to adjust incident light from a photographic subject and uses a lens system to form an image of the incident light on a light receiving surface of the solid-state imaging device; characterized in that: the interchangeable lens is provided with a first storage portion which stores individual difference information about brightness of the interchangeable lens; and the lens-interchangeable type imaging apparatus body is provided with a second storage portion which stores information about a change of incident light sensitivity of the solid-state imaging device relative to each diaphragm value, and a control portion which uses the individual difference information about the brightness read from the first storage portion of the mounted interchangeable lens and the information about the change of the sensitivity in the second storage portion to thereby correct exposure at the time of imaging the photographic subject.

In addition, the imaging apparatus according to the embodiment is characterized in that: the individual difference information stored in the first storage portion is stored as correction coefficient data for correcting the brightness of the interchangeable lens; and the information about the change of the sensitivity stored in the second storage portion is stored as correction coefficient data for correcting the sensitivity of the solid-state imaging device.

In addition, the imaging apparatus according to the embodiment is characterized in that: the control portion uses an exposure correction coefficient obtained from the individual difference information and the information about the change of the sensitivity to correct a gain at the time of imaging.

In addition, the imaging apparatus according to the embodiment is characterized in that: the control portion uses an exposure correction coefficient obtained from the individual difference information and the information about the change of the sensitivity to correct a photometric value.

In addition, the imaging apparatus according to the embodiment is characterized in that: the individual difference information stored in the first storage portion is stored after classified into individual difference information when the diaphragm is driven to an open aperture side and individual difference information when the diaphragm is driven to a small aperture side.

In addition, the imaging apparatus according to the embodiment is characterized in that: the individual difference information stored in the first storage portion is stored after classified into individual difference information about each diaphragm value of the diaphragm and individual difference information other than the diaphragm value.

In addition, the imaging apparatus according to the embodiment is characterized in that: the individual difference information other than the diaphragm value includes a light reduction component of the interchangeable lens.

In addition, the imaging apparatus according to the embodiment is characterized in that: the individual difference information is stored in the first storage portion after classified into information about an error of each aperture diameter of the diaphragm, information about an error of lens transmittance of the interchangeable lens, and information about a transmittance error of transmittance indicating light reduction characteristic of the interchangeable lens.

In addition, an interchangeable lens according to an embodiment is characterized by being the interchangeable lens according to any one of the aforementioned paragraphs.

In addition, a lens-interchangeable type imaging apparatus body according to an embodiment is characterized by being the lens-interchangeable type imaging apparatus body according to any one of the aforementioned paragraphs.

In addition, a control method of an imaging apparatus according to an embodiment is a control method of an imaging apparatus provided with: a lens-interchangeable type imaging apparatus body which includes a solid-state imaging device; and an interchangeable lens which is detachably mounted on the lens-interchangeable type imaging apparatus body and which uses a diaphragm to adjust incident light from a photographic subject and uses a lens system to form an image of the incident light on a light receiving surface of the solid-state imaging device, the method being characterized by including the step of: using individual difference information about brightness of the mounted interchangeable lens read from a storage portion of the interchangeable lens and information about a change of incident light sensitivity of the solid-state imaging device relative to each diaphragm value stored in a storage portion of the lens-interchangeable type imaging apparatus body to thereby correct exposure at the time of imaging the photographic subject.

According to the aforementioned embodiments, the photometric value or the imaging gain can be corrected properly without being affected by the individual difference of the lens and the F-number dependence of the sensitivity of the imaging device so that a high quality image of a photographic subject can be taken.

INDUSTRIAL APPLICABILITY

The imaging apparatus according to the invention can correct the photometric value or the imaging gain using the individual difference information for each lens and the information about the F-number dependence of the sensitivity of the imaging device. Accordingly, the imaging apparatus according to the invention is useful when it is applied to a lens-interchangeable type imaging apparatus such as a mirrorless interchangeable-lens camera.

The present application is based on Japanese Patent Application No. 2011-288030 filed on Dec. 18, 2011, the contents of which will be incorporated herein by reference.

REFERENCE SIGNS LIST 10 imaging apparatus
20, 20' interchangeable lens
21, 21' diaphragm (iris)
21b diaphragm motor driver
23b ND filter motor driver
22 focus lens
23 ND (neutral density) filter
27 lens brightness individual difference information
30 lens-interchangeable type imaging apparatus body
31 solid-state imaging device
31a gain setting portion
40 CPU
40a diaphragm setting portion
40b correction quantity calculating portion
41 AE & AWB detecting circuit
41a AE evaluation value correcting portion
42 memory
43 memory for information about F-number dependence of sensitivity of imaging device

The invention claimed is:

1. An imaging apparatus comprising: a lens-interchangeable type imaging apparatus body which comprises a solid-state imaging device; and an interchangeable lens which is detachably mounted on the lens-interchangeable type imaging apparatus body and which uses a diaphragm to adjust incident light from a photographic subject and uses a lens system to form an image of the incident light on a light receiving surface of the solid-state imaging device; wherein:
   the interchangeable lens is provided with a first storage portion which stores individual difference information about brightness of the interchangeable lens, wherein said difference information indicates whether the brightness of the interchangeable lens is deviated from a design value;
   the lens-interchangeable type imaging apparatus body is provided with a second storage portion which stores information about a change of incident light sensitivity of the solid-state imaging device relative to each diaphragm value, and a control portion which uses the individual difference information about the brightness read from the first storage portion of the mounted interchangeable lens and the information about the change of the sensitivity in the second storage portion to thereby correct exposure at a time of imaging the photographic subject; and
   the individual difference information stored in the first storage portion is stored after classified into individual difference information when the diaphragm is driven to an open aperture side and individual difference information when the diaphragm is driven to a small aperture side.

2. The imaging apparatus according to claim 1, wherein:
   the individual difference information stored in the first storage portion is stored as correction coefficient data for correcting the brightness of the interchangeable lens; and
   the information about the change of the sensitivity stored in the second storage portion is stored as correction coefficient data for correcting the sensitivity of the solid-state imaging device.

3. The imaging apparatus according to claim 1, wherein:
   the control portion uses an exposure correction coefficient obtained from the individual difference information and the information about the change of the sensitivity to correct a gain at the time of imaging.

4. The imaging apparatus according to claim 1, wherein:
   the control portion uses an exposure correction coefficient obtained from the individual difference information and the information about the change of the sensitivity to correct a photometric value.

* * * * *